United States Patent Office 3,781,261

Patented Dec. 25, 1973

1

3,781,261
METALATING RUBBER POLYMERS

Adel F. Halasa, Bath, Ohio, assignor to The Firestone Tire & Rubber Company, Akron, Ohio No Drawing. Filed Feb. 3, 1972, Ser. No. 223,365
Int. Cl. C08d 5/02
U.S. Cl. 260—94.7 2 Claims

ABSTRACT OF THE DISCLOSURE

Rubber polymers which are (1) homopolymers or copolymers of conjugated dienes or (2) copolymers of a conjugated diene and a vinyl aromatic monomer are metalated by reaction with alkyl or aryl sodium or potassium in combination with a lithium alkoxide. Sodium or potassium alkoxide may also be present.

This invention relates to the metalation of rubber polymers which are homopolymers or copolymers of conjugated dienes containing 4 to 6 carbon atoms or copolymers of such a conjugated diene and vinyl aromatic monomer (such as styrene, etc.), using a sodium or potassium hydrocarbon alkyl or hydrocarbon aryl together with a lithium alkoxide. The copolymers may be random copolymers or block copolymers. Sodium or potassium alkoxide may also be present. The metalated polymer may be used where other metalated polymers have been used, as in the production of copolymers by reaction with an alkyl halide.

The invention includes a novel procedure for the preparation of sodium and potassium alkyls.

The preferred sodium or potassium alkyl is one which contains 4 to 8 carbon atoms in a straight or branched chain, such as straight or branched chain butyl, amyl, hexyl, heptyl or octyl; the sodium or potassium hydrocarbon aryl may be, for instance, phenyl, tolyl, xylyl, naphthyl, anthracyl, styryl, alpha-methyl styryl, etc. Sodium or potassium n-butyl or t-butyl is usually employed.

There is art on the use of alkoxides in polymerization reactions, but not for metalation. See, for example, Forman 3,607,851.

Wofford 3,294,768 and Strobel 3,331,821 disclose the use of organosodium and organopotassium compounds in combination with lithium alkoxides as initiators for butadiene and butadiene-styrene, etc., polymerizations.

We find in Naylor 3,492,369 this explanation of the functioning of alkali metal compounds for metalation:

> The metalating agent is limited to organolithium compounds. Organosodium and organopotassium compounds are unsuitable because they undergo chain transfer reactions . . . Preferred compounds are the n-alykyllithium compounds containing from 3–5 carbon atoms per molecule." (column 4, lines 35–43.)

Experimental data are given below which support the above conclusions of Naylor.

According to this invention, sodium and potassium alkyl and hydrocarbon aryl compounds which are known as initiators are used for metalation by using 0.05 to 20.0 parts of sodium or potassium as alkyl or aryl initiator, per 100 parts of polymer with 0.1 to 50 to 1000 parts of lithium in the lithium alkoxide which alkoxide contains 1 to 20 carbon atoms; the preferred ratio of sodium or potassium to lithium is 0.1 to 100–500. One-tenth to 50 parts of sodium or potassium as alkoxide per 100 parts of polymer may be used with the lithium alkoxide. Alkoxides containing 1 to 20 carbon atoms may be used. A temperature of 0 to 100° C. may be used. Any aliphatic solvent usually employed in polymerizing butadiene may be used. The sodium and potassium t-amylates and menthylates are readily soluble in cyclic hydrocarbon aliphatic solvents containing 5 to 8 carbon atoms, for example, and will generally be used in commercial operations because solutions of higher solute content may be used. If alkyl sodium is used, potassium alkoxide may be used with the lithium alkoxide; and if alkyl potassium is used, either sodium or potassium alkoxide or both may be used with lithium alkoxide.

2

The preferred alkyl reagents are n-BuNa and n-BuK. They must be very pure—purer than is obtained by the usual procedures. Preferred methods of preparation are represented by the following equations:

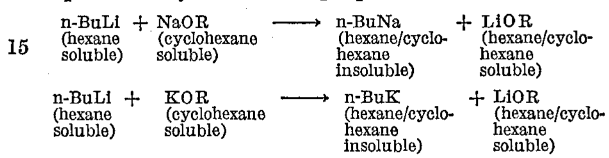

R preferably represents an amyl or menthyl radical.

Although cyclohexane is the preferred solvent, other cycloalkanes of 5 to 10 carbon atoms may be used. A temperature of −20 to 50° C. may be used and preferably a temperature of −10 to 25° C.

The reaction is preferably carried out in cyclohexane, and temperatures of −30 to 25° C. may be used. Lithium alkoxide is soluble in cyclohexane and remains in solution. n-BuNa and n-BuK are insoluble in hexane and precipitate out. After several washings with hydrocarbon solvent, the n-BuNa and n-BuK are obtained in a very pure state, greater than 99.5 percent.

Alternatively, a more usual reaction may be used, such as:

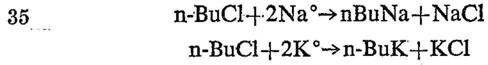

This method may be used even though sodium or potassium chloride is present (as impurity) with the BuNa or BuK present in the reaction with the sodium or potassium alkoxide.

The preparation of the t-amylates or menthylates of sodium and potassium is represented by these equations in which cyclohexane is the solvent:

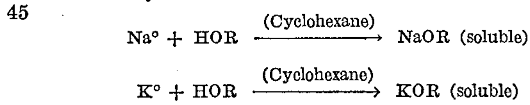

R preferably represents t-amyl or menthyl.

The preparations are preferably carried out at −50° to 50° C. (and preferably −30 to 50° C.) in cyclohexane in which the t-amylates and methylates are soluble.

The invention is illustrated by the following examples. The polybutadiene used was a rubber polymer derived with butyllithium initiator.

EXAMPLE 1

Preparation of potassium t-alkyls

To a 28-oz. bottle containing 400 ml. of cyclohexane, was added .05 mole of potassium t-amylate. (Potassium t-amylate is prepared according to any standard procedure published in the literature, as by adding potassium metal to tert-amyl alcohol in hydrocarbon solvent.) The solution was cooled to −5° C. and to this was added, dropwise, .05 millimole of n-butyllithium in hexane. Immediately a precipitate was formed and more of the solid formed as more n-butyllithium was added. After the addition of all of the n-butyllithium, the solid which had formed in the bottom of the bottle was isolated in an inert atmosphere using a dry vacuum box filled with argon. This solid, which was n-butyl potassium, was separated from the cyclohexane solvent which may contain a minor amount of hexane or other aliphatic hydrocarbon solvent in which the potassium t-amylate is prepared. The precipitate is washed several times with cyclohexane. The n-butyl potassium was placed in a 28-oz. bottle containing 400 ml. of cyclohexane where it was dispersed and used in the metalation of rubber.

An analysis of the solid by flame photometry showed potassium metal present in 99.9 percent purity. Titration of the solid, using the Gilman procedure, analyzed for 95 percent carbon-bound potassium, as n-butyl potassium.

Following the same procedure as above, the following alkyl potassiums were made:

| Metal | Alkyl group | Purity |
|---|---|---|
| K | tert-Butyl | 99.5 |
| K | Sec.-butyl | 99.8 |
| K | Cyclopentyl | 99.8 |

Any one or a mixture of these may be used instead of n-butyl potassium.

EXAMPLE 2

Preparation of sodium alkyls

The procedure of Example 1 was followed, except that sodium t-amylate was dissolved in cyclohexane. After complete addition of the n-butyllithium the solid which precipitated out (which was n-butyl sodium) was collected in the same manner as described for the potassium compound in Example 1. It was shown upon analysis with flame-photometry spectrum to contain 99.95 percent sodium. The Gilman titration gave 95 percent carbon-bound sodium. This solid was placed in cyclohexane and dispersed in it and then used for metalation of polymers.

METALATION OF POLYMERS

The polybutadiene referred to in the following example may be prepared by any known method as long as it is free of moisture and active hydrogen compounds that destroy the catalyst.

EXAMPLE 3

A solution of 100 grams polybutadiene in 500 ml. of hexane, moisture- and oxygen-free, is placed into a 28-oz. bottle. To this solution is added 6 millimoles of n-butyl potassium or sodium prepared according to Example 1 or 2. This is dispersed in a larger amount of cyclohexane to produce a solution blend which is essentially cyclohexane and thus a solvent for the sodium and potassium alkoxides which are used. To this is added 10 millimoles of lithium t-butoxide in hexane and the preparation is placed in a 50° C. polymerization bath for 6 hours.

In order to determine the efficiency and effectiveness of the metalation, the metalated polymer was treated with 12 ml. (18%) of freshly distilled styrene and placed in the 50° C. polymerization bath for 4 hours, in order to determine the extent of the metalation. The styrenated copolymer was then recovered by coagulation and stabilized with antioxidant. It was analyzed by IR analysis to determine the styrene found, and examined for homostyrene content by gel permeation chromatography. The percent of grafted styrene was found by difference.

Metalation efficiency and effectiveness are defined, as follows:

$$\text{Metalation efficieny} = \frac{\text{Polystyrene grafted}}{\text{Polystyrene grafted} + \text{homostyrene}}$$

$$\text{Metalation effectiveness} = \frac{\text{Mn}^{-}\text{ calculated}}{\text{Mn}^{-}\text{ found}}$$

See Table I for the conditions of ten different reactions, with the results.

TABLE I

| Example | 3 | 4 | 5 | 6 | 7 | 8 | 9 | 10 |
|---|---|---|---|---|---|---|---|---|
| Polybutadiene, parts | 100 | 100 | 100 | 100 | 100 | 100 | 100 | 100 |
| n-BuK, parts* | 0.078 | 0.156 | 0.234 | 0.312 | | | | |
| n-BuNa, parts* | | | | | 0.046 | 0.092 | 0.138 | 0.184 |
| t-BuOLi, parts* | 0.07 | 0.14 | 0.21 | 0.28 | 0.07 | 0.14 | 0.21 | 0.28 |
| Metalation time, hours | 3 | 3 | 3 | 3 | 3 | 3 | 3 | 3 |
| Metalation temp., ° C | 50 | 50 | 50 | 50 | 50 | 50 | 50 | 50 |
| Styrene added, grams | 30.0 | 30.0 | 30.0 | 30.0 | 30.0 | 30.0 | 30.0 | 30.0 |
| Percent styrene found by IR analysis | 16 | 17.9 | 15.7 | 18 | 16 | 17.9 | 15.7 | 18 |
| Percent metalation efficiency | 93 | 95 | 97 | 95 | 90 | 97 | 100 | 100 |
| Mn⁻ (Number average molecular weight of styrene block grafted): | | | | | | | | |
| Found (G.P.C.) | 92,000 | 54,000 | 65,000 | 52,000 | 29,000 | 60,000 | 69,000 | 60,000 |
| Calculated | 15,000 | 7,500 | 5,000 | 3,700 | 15,000 | 7,500 | 5,000 | 3,700 |
| Percent metalation effectiveness | 16.30 | 7.20 | 7.69 | 7.11 | 51.72 | 12.50 | 7.24 | 6.16 |

*Parts are calculated as based on metal only.

The following sodium alkyls were prepared according to the foregoing procedure:

| Metal | Alkyl group | Purity |
|---|---|---|
| Na | tert-Butyl | 99.5 |
| Na | Sec.-butyl | 98.3 |
| Na | Cyclopentyl | 99.5 |

Any of them may be used in the metalation described.

EXAMPLE 4

In similar runs, lithium t-butoxide was added, as indicated in Table II. The metalation effectiveness was materially increased.

TABLE II

| Example | 1 | 2 | 3 | 4 | 5 | 6 | 7 | 8 |
|---|---|---|---|---|---|---|---|---|
| Polybutadiene, parts | 100 | 100 | 100 | 100 | 100 | 100 | 100 | 100 |
| Example | 1 | 2 | 3 | 4 | 5 | 6 | 7 | 8 |
| Polybutadiene, parts | 100 | 100 | 100 | 100 | 100 | 100 | 100 | 100 |
| n-Butyl potassium, parts* | 0.0078 | 0.0156 | 0.234 | 0.312 | | | | |
| n-Butyl sodium, parts* | | | | | 0.046 | 0.092 | 0.138 | 0.184 |
| t-BuOLi, parts* | 0.07 | 0.14 | 0.21 | 0.28 | 0.07 | 0.14 | 0.21 | 0.28 |
| t-Amyl-ONa, parts* | 0.046 | 0.092 | 0.138 | 0.184 | | | | |
| t-Amyl-OK, parts* | | | | | 0.0078 | 0.0156 | 0.234 | 0.312 |
| Metalation time, hours | 4 | 4 | 4 | 4 | 4 | 4 | 4 | 4 |
| Metalation temp., ° C | 50 | 50 | 50 | 50 | 50 | 50 | 50 | 50 |
| Styrene added, parts | 20.0 | 20.0 | 20.0 | 20.0 | 20.0 | 20.0 | 20.0 | 20.0 |
| Percent metalation efficiency | 30 | 50 | 60 | 80 | 20 | 30 | 70 | 90 |
| Percent homostyrene content | 70 | 50 | 40 | 20 | 80 | 70 | 30 | 10 |
| Mn⁻ (average number molecular weight of block styrene grafted): | | | | | | | | |
| Found (G.P.C.) | 70,000 | 64,000 | 25,000 | 35,000 | 22,000 | 28,000 | 33,000 | 55,0 |
| Calculated | 10,000 | 5,000 | 3,000 | 2,500 | 10,000 | 5,000 | 3,000 | 2,500 |
| Percent metalation effectiveness | 14.28 | 7.81 | 12.00 | 7.14 | 22.00 | 17.80 | 9.00 | 4.54 |

*Parts are calculated as based on metal only.

I claim:

1. The process of metalating rubbery polybutadiene which comprises treating 100 parts of polybutadiene with (a) 0.05 to 20 parts of potassium or sodium as potassium or sodium alkyl or a mixture thereof, the alkyl group containing 4 to 8 carbon atoms, (b) 0.1 to 1000 parts of lithium as lithium alkoxide and (c) 0.01 to 50 parts of sodium or potassium as alkoxide in solution in an aliphatic hydrocarbon solvent at 0° C. to 100° C., the alkoxides containing 1 to 20 carbon atoms.

2. The process of claim 1 in which sodium or potassium t-butyl is used with lithium butoxide and sodium or potassium t-amylate or menthylate, and the solvent is cyclohexane.

References Cited

FOREIGN PATENTS

| | | | |
|---|---|---|---|
| 873,656 | 7/1961 | Great Britain | 260—94.2 |
| 1,478,225 | 3/1967 | France | 260—877 X |
| 1,144,151 | 3/1969 | Great Britain | 260—877 X |

JOSEPH L. SCHOFER, Primary Examiner

W. F. HAMROCK, Assistant Examiner

260—85.1, 94.7 R

PO-1050
(5/69)

UNITED STATES PATENT OFFICE
CERTIFICATE OF CORRECTION

Patent No. 3,781,261 Dated December 25, 1973

Inventor(s) Adel F. Halasa

It is certified that error appears in the above-identified patent and that said Letters Patent are hereby corrected as shown below:

Column 1, Line 51, quotation marks should appear at the beginning of the line.

Column 2, Line 53, "methylates" should be --menthylates--.

Columns 3 and 4, Lines 60 and 61 should be deleted.

Column 4, Line 75, "55,0" should be --55,000--.

Signed and sealed this 9th day of April 1974.

(SEAL)
Attest:

EDWARD M.FLETCHER,JR.
Attesting Officer

C. MARSHALL DANN
Commissioner of Patents